H. GOODWIN.
FIRE PREVENTION DEVICE FOR MOTION PICTURE APPARATUS.
APPLICATION FILED DEC. 30, 1919.

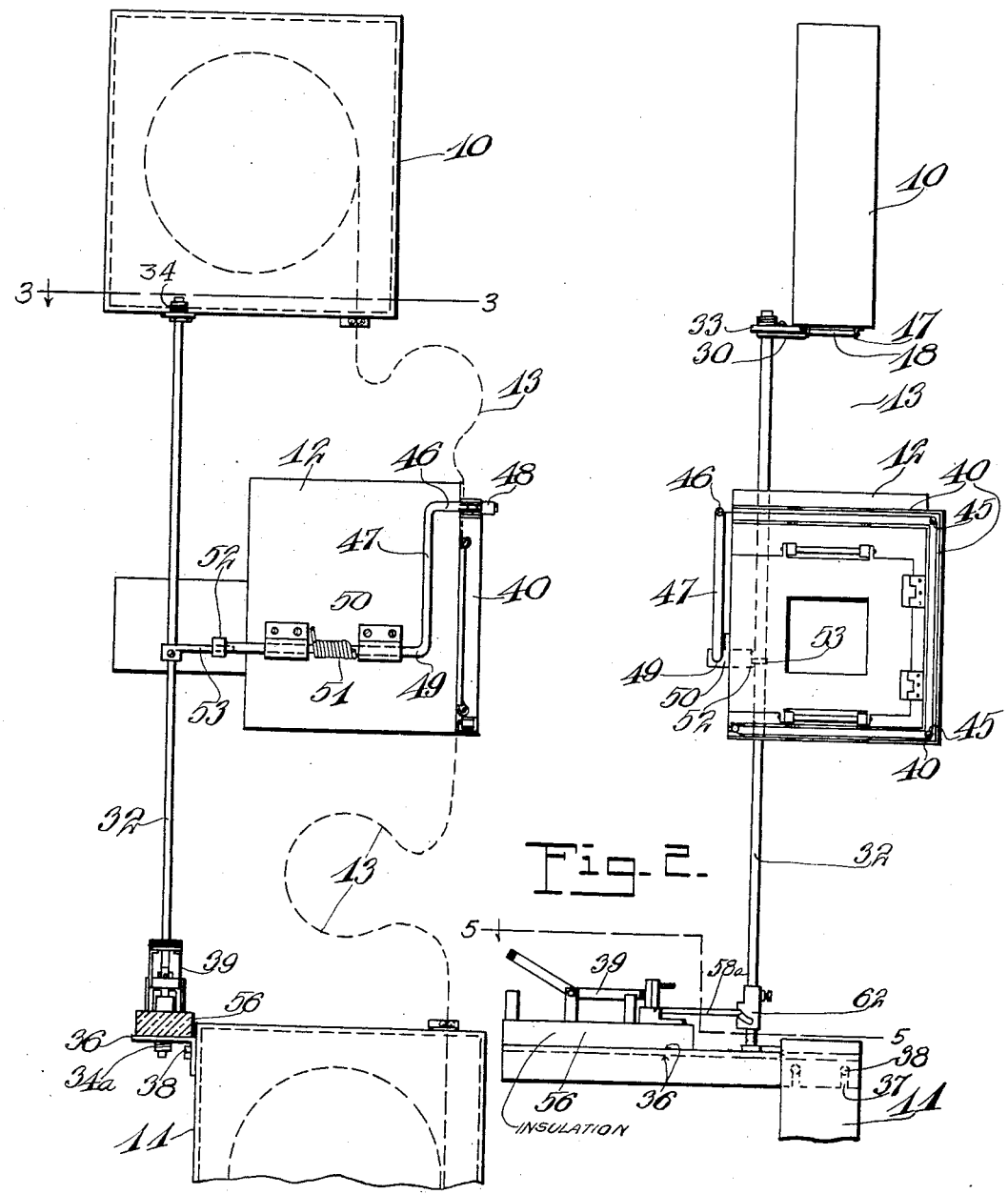

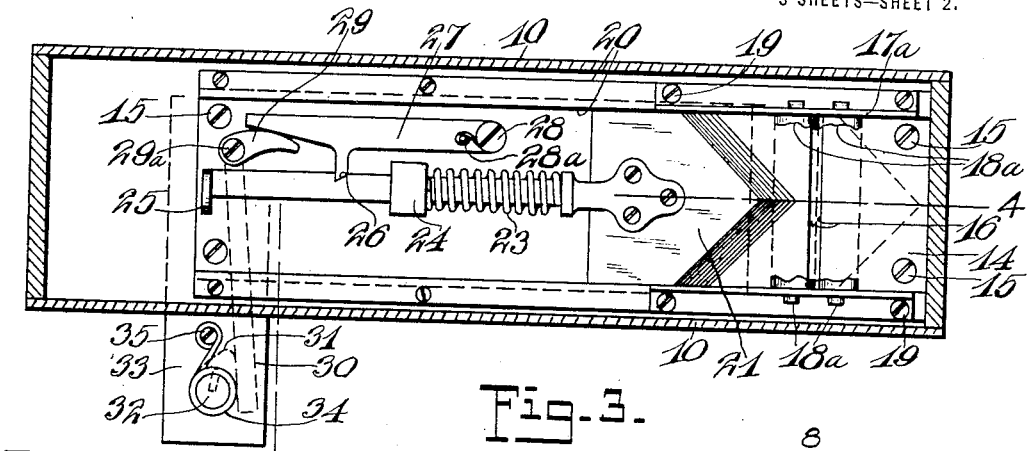

1,353,389.

Patented Sept. 21, 1920.

INVENTOR:
Hall Goodwin.
BY
ATTORNEYS.

UNITED STATES PATENT OFFICE.

HALL GOODWIN, OF CHICAGO, ILLINOIS.

FIRE-PREVENTION DEVICE FOR MOTION-PICTURE APPARATUS.

1,353,389.   Specification of Letters Patent.   Patented Sept. 21, 1920.

Application filed December 30, 1919. Serial No. 348,352.

*To all whom it may concern:*

Be it known that I, HALL GOODWIN, a citizen of the United States, residing at Chicago, in the county of Cook and State of Illinois, have invented new and useful Improvements in Fire-Prevention Devices for Motion-Picture Apparatus, of which the following is a specification.

This invention relates to devices applicable to motion picture apparatus and designed to prevent the spread of fire to the film magazines in case the film should take fire while passing through the projecting apparatus.

The invention has for its object to provide a novel and improved means for severing the film so that the fire cannot reach the film magazines, thereby confining the blaze to a relatively short strip of film which is easily extinguished. Simultaneously with the severing of the film, the arc lamp of the projecting apparatus is extinguished, and the lights of the auditorium are switched on.

The object stated is attained by means of a combination and arrangement of parts to be hereinafter described and claimed, and in order that the same may be better understood, reference is had to the accompanying drawings forming a part of this specification.

In the drawings,

Figure 1 is a side elevation of a fragment of a motion picture apparatus equipped with the safety device;

Fig. 2 is a rear elevation thereof;

Fig. 3 is an enlarged horizontal section on the line 3—3 of Fig. 1;

Fig. 4 is a section on the line 4—4 of Fig. 3;

Fig. 5 is a diagram and section on the line 5—5 of Fig. 2;

Figure 6:
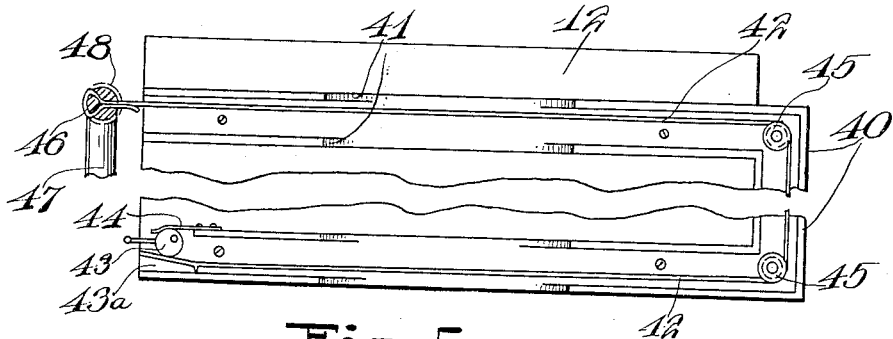
Fig. 6 is an enlarged rear view, partly broken away, of the projector box.

Referring specifically to the drawings, 10 denotes the upper film magazine of a motion picture apparatus. The lower film magazine is shown at 11, the projecting box at 12, and the film at 13. A suitable mechanism unwinds the film from a reel in the upper magazine and winds it on a reel in the lower magazine. This mechanism forms no part of the present invention, and hence has not been illustrated.

Associated with the upper magazine 10 is a film cutting device, by which, in the event of the film catching fire, the latter is severed to prevent the burning portion from reaching that portion of the film which is in the magazine. This mechanism consists of the following parts:

On the bottom of the magazine 10, on the inside thereof, is mounted a base plate 14, the same being secured by screws 15, and having a slit 16 for exit of the film 13, the bottom of the magazine having a corresponding slit $16^a$. Adjacent to the film slits, on the outside of the magazine, are mounted frame pieces 17 for film guide-rollers 18, and on the inside of the magazine are similar rollers $18^a$ with their supports $17^a$, the latter being secured by bolts 19 to the guides 20 of a film severing knife 21. The knife 21 seats on top of the base plate 14 and is slidable across the film slit 16, it being normally positioned off to one side thereof as shown in Fig. 4. The knife 21 is guided by seating at its side edges under the guides 20, which latter are secured to the base plate 14. The cutting portion of the knife is spear-shaped, or pointed so as to first pierce the film to give the cut a positive start, and then follow with a sheer cut in two directions.

The knife 21 has a shank 22 around which is coiled a spring 23 seating between a bearing block 24 in which the shank is slidably supported, and an abutment $24^a$ on the shank. The knife is held retracted normally, and when released, the spring urges it forward to make a working stroke. The rear end of the knife shank has a finger hold 25 to facilitate manual retraction and setting of the knife.

For holding the knife 21 retracted, the shank 22 has a side notch 26 for a detent 27 pivoted at 28 to the base 14, and provided with a spring $28^a$ for holding it in the notch.

The free end of the detent 27 is in the path of a cam or wiper 29 which is operable to swing the detent out of the notch 26 and thus release the knife 21, so that it may be advanced for a working stroke by the spring 23. The cam 29 is pivoted at $29^a$ to the base 14, and has an integral actuating arm or lever 30, which latter is in the path of a wiper or cam 31 on a vertically positioned rock-shaft 32 extending between the magazines 10 and 11, and supported at its upper end by a bearing plate 33 mounted on the bottom of the magazine 10. Above the bearing plate 33, the shaft 32 is engaged by a spring 34 secured at 35 to the bearing plate, and tending to turn the shaft in a direction to release the detent 27 through the parts 31, 30 and 29, when said shaft is released. A fusible element to be presently described, is provided for locking the shaft 32.

The film severing mechanism hereinbefore described is duplicated at the magazine 11, it being mounted beneath the top thereof where the film enters; also a lever 30ᵃ corresponding to lever 30 protrudes from the end of the magazine onto a platform 36, through which latter the lower end of rod 32 passes, the cam 31ᵃ being above the platform. The guide roller assembly 18 of the magazine 10 is duplicated at 18ᵇ in the magazine 11. As shown in Figs. 1 and 2, the platform 36 is of angle construction, and its back has slots 37 to slide over bolts 38 and be secured thereby.

The platform 36 also supports an electric switch 39 controlling certain circuits to be presently described.

The fusible means associated with the shaft 32 consists of the following parts:

Referring to Figs. 1, 2, 6 and 7, it will be seen that the back of the projector box 12 is fitted with a channeled frame 40 on three sides. The webs of this frame are cut away in certain places to produce recesses 41, and the frame forms a housing for a corresponding length of a fusible film ribbon 42. This ribbon is impregnated with highly inflammable substances so that it will quickly catch fire and become consumed in case the film 13 should begin to burn, a very slight heat sufficing to set the ribbon on fire. The position of the fusible ribbon is such that it is exposed to the fire from the burning film whether the flames from the latter rise or fall, and hence the operation of the device is assured.

Figure 7:
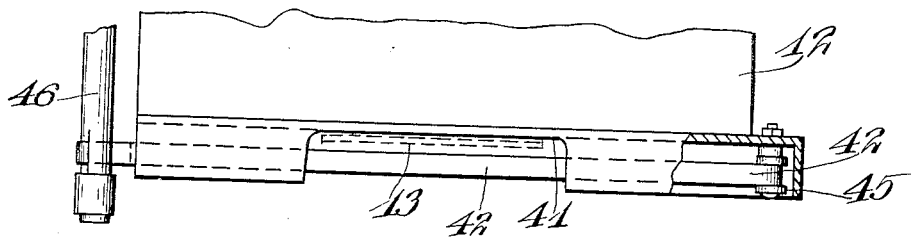
Fig. 7 is a plan view, partly in section, of said box.
Figure 8:
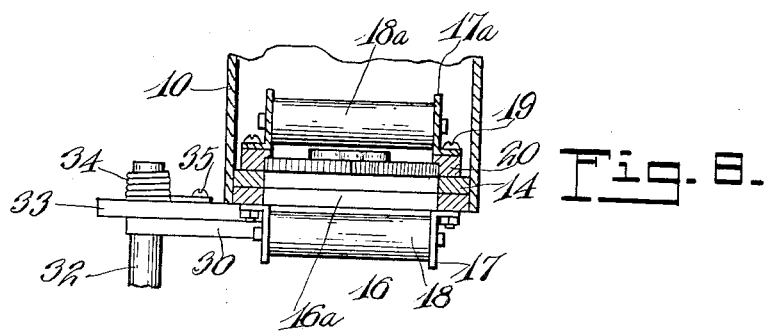
Fig. 8 is a section on the line 8—8 of Fig. 4.

The lower end of the ribbon 42 is held fast by an eccentric 43 and a wedge block 43ᵃ, assisted by a spring 44 and bearing on the eccentric. Guide rollers 45 for the ribbon at the corners of the frame 40 are also provided. The upper end of the ribbon is connected to the terminal bend 46 of a crank 47. As shown in Figs. 6 and 7, the part 46 is cut endwise to form three slits through which the ribbon 42 is passed back and forth, and thus anchored, with a ferrule 48 slipped over the part 46 to cause the ribbon to be firmly clamped. The crank 47 has at its lower end a lateral bend to form a rock shaft 49 supported in bearings 50 on the wall of the projector box 12, said shaft being given a tendency to swing crank 47 by a torsion spring 51.

As shown in Figs. 1 and 2, the forward end of shaft 49 carries an abutment 52 which normally is engaged by an arm 53 extending laterally from shaft 32 to lock the same against being turned by the spring 34 and a similar spring 34ᵃ beneath the platform 36.

It will be evident that when the ribbon 42 is tight and intact, it holds the shaft 49 against being turned by its spring 51, but when the ribbon is severed upon catching fire, said shaft is released, whereupon it swings in a direction to take the abutment 52 away from the arm 53, with the result that the shaft 32 is now also freed and is then turned by the springs 34 and 34ᵃ to release the detents 27 through the intermediaries hereinbefore described, and as the film severing knives 21 are now released, they are advanced by their springs 23 to sever the film 13.

Figure 9:
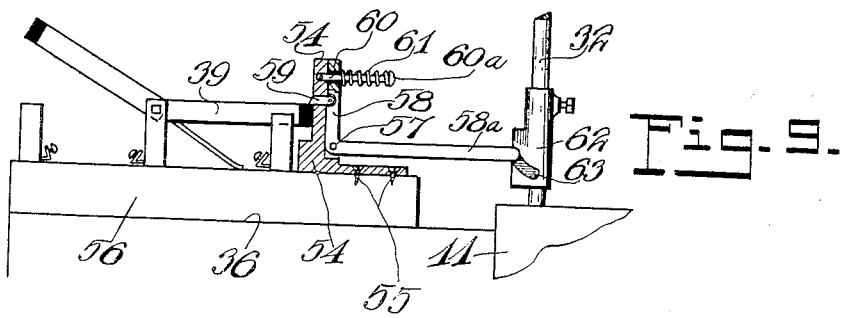
Fig. 9 is an enlarged elevation, partly in section, of a switch mechanism.

In order that arc lamp A of the projecting apparatus may be extinguished when the film 13 catches fire, and at the same time the lights B of the auditorium be turned on, the following mechanism is provided, particular reference being had to Figs. 2, 5 and 9:

A standard 54 is secured, as shown at 55, to a base 56 of insulating material mounted on the platform 36. This base also supports the switch 39. To the standard 54 is pivoted, as shown at 57, an L-shaped lever having one of its arms 58 carrying a pivoted latch dog 59 working in an aperture in the standard and adapted to engage the cross bar of the switch, the latter being an ordinary double-pole, double-throw switch connected in the usual manner with the feed circuit C, and the circuits of the lamp A and the auditorium lights B as shown in Fig. 5. In one position of the switch, the circuit of the lamp A is closed and the circuit of the lights B is open. The switch is held in this position by the dog 59. When the switch is released by the dog 59, its spring throws it over to close the circuit of the auditorium lights B, so that the latter are switched on, and at the same time the lamp A is at once extinguished.

The dog 59 is also controlled by the fusible device so that the switch is operated as described when the film 13 catches fire. This is done by fitting to the shaft 32 a collar 62 having an oblique groove 63 into which extends the arm 58ᵃ of the lever carrying the latch dog 59. Thus, it will be seen that when the shaft 32 turns to release the film severing means, the dog 59 is retracted to release the switch 39.

The standard 54 carries a pivoted stem 60 projecting loosely through an aperture in the lever arm 58 to take an expansive spring 61 limited by the head 60ᵃ at the rear end of the stem. This spring serves to eliminate looseness in the parts, and also tends to swing the lever supporting the dog 59 in a direction to retain the same in switch-holding position, so as to permit proper setting of the collar 62 on the shaft 32, or the removal thereof for repairs.

I claim:

1. In a motion picture apparatus, a film severing knife, a detent for holding the knife retracted, means for operating the knife when released, a rock shaft, means operated by the rock-shaft for disengaging the detent, a spring for operating the rock shaft, and means for locking the rock-shaft against actuation, said locking means comprising a shaft having a crank and an abutment, an arm extending from the rock shaft and engageable by the abutment, a fusible element connected to the crank for locking its shaft, and means for turning said shaft to disengage the abutment from the arm when the fusible element is ruptured.

2. In a motion picture apparatus, a film severing knife, a detent for holding the knife retracted, a pivoted member engageable with the detent for releasing the same, means for operating the knife when released, a rock shaft having means for actuating the pivoted member, a spring for operating the rock shaft, and means for locking the rock shaft against actuation, said locking means comprising a shaft having a crank and an abutment, an arm extending from the rock shaft and engageable by the abutment, a fusible element connected to the crank for locking its shaft, and means for turning said shaft to disengage the abutment from the arm when the fusible element is ruptured.

3. In a motion picture apparatus, a switch controlling the lamp of the apparatus and the lighting circuit of the auditorium, a detent for holding the switch in position to close the lamp circuit, means for throwing the switch to open the lamp circuit and to close the lighting circuit when the detent is tripped, and operating means for the detent comprising an angle lever one of the branches of which carries the detent, a rock shaft, a member on the rock shaft having an oblique groove into which the other arm of the lever extends, fusible means for locking the shaft, and means for actuating the shaft when the fusible means is ruptured.

In testimony whereof I affix my signature.

HALL GOODWIN.